United States Patent
Noller et al.

(10) Patent No.: US 12,356,159 B2
(45) Date of Patent: Jul. 8, 2025

(54) AUDIO SYSTEM WITH ADJUSTABLY DELAYED FREQUENCIES

(71) Applicant: Bose Corporation, Framingham, MA (US)

(72) Inventors: Roland Noller, Koengen (DE); Michael S. Dublin, Arlington, MA (US)

(73) Assignee: Bose Corporation, Framingham, MA (US)

( * ) Notice: Subject to any disclaimer, the term of this patent is extended or adjusted under 35 U.S.C. 154(b) by 249 days.

(21) Appl. No.: 17/969,265

(22) Filed: Oct. 19, 2022

(65) Prior Publication Data
US 2024/0137696 A1 Apr. 25, 2024
US 2024/0236564 A9 Jul. 11, 2024

(51) Int. Cl.
*H04R 3/04* (2006.01)
*G06F 3/16* (2006.01)

(52) U.S. Cl.
CPC ............... *H04R 3/04* (2013.01); *G06F 3/165* (2013.01)

(58) Field of Classification Search
CPC .................................. H04R 3/04; G06F 3/165
See application file for complete search history.

(56) References Cited

U.S. PATENT DOCUMENTS

| | | | | |
|---|---|---|---|---|
| 2005/0084117 A1* | 4/2005 | Miyashita | ............... | H03G 5/10 381/98 |
| 2007/0274538 A1* | 11/2007 | Van Reck | ............... | H04R 3/04 381/98 |
| 2008/0013750 A1* | 1/2008 | Suzuki | ............... | H04R 3/04 381/97 |
| 2009/0116653 A1* | 5/2009 | Yoshino | ............... | H04R 3/04 381/17 |
| 2010/0241433 A1* | 9/2010 | Herre | ............... | G10L 19/022 704/500 |
| 2015/0279346 A1* | 10/2015 | Hera | ............... | G10K 11/18 381/86 |
| 2017/0280240 A1* | 9/2017 | Hu | ............... | H04R 29/001 |
| 2020/0389726 A1* | 12/2020 | Melanson | ............ | G10L 21/0232 |
| 2023/0209300 A1* | 6/2023 | Udesen | ............... | H04S 7/307 381/310 |
| 2024/0282287 A1* | 8/2024 | Küppers | ............ | G10K 11/1752 |

FOREIGN PATENT DOCUMENTS

CN 110024419 A * 7/2019 ............. H03G 3/301

* cited by examiner

*Primary Examiner* — Oyesola C Ojo
(74) *Attorney, Agent, or Firm* — Bose Corporation

(57) ABSTRACT

Systems, methods, and processing are provided for adjusting an audio playback signal to adjust a temporal alignment of content within an audio signal. The audio signal is received and filtered to provide an adjusted audio signal. The adjusted audio signal includes a delay in a first range of frequencies relative to a second range of frequencies, and the adjusted audio signal is provided to a sound reproduction system, such as an amplifier and at least one acoustic transducer.

20 Claims, 3 Drawing Sheets

AUDIO SYSTEM WITH ADJUSTABLY DELAYED FREQUENCIES

BACKGROUND

Various audio systems reproduce audio from audio signals that are amplified and played through one or more acoustic transducers, e.g., loudspeakers. In many cases, an audio system supports multiple input channels, such as a stereo left-right pair or even more audio channels and/or metadata as in surround sound and/or spatial audio systems. Such audio systems generally include multiple loudspeakers, each of which may be in varying locations and cover varying portions of the audio spectrum. In many systems various audio signal processing, up-mixing, down-mixing, and the like may be performed, and such signal processing and mixing may cause portions of the audio signal to be delayed relative to other portions, especially when the portions include differing regions of the audio spectrum. For example, a musical recording may include sounds of a bass drum and a cymbal that occur at the same time, but after processing by an audio system the relatively lower frequency bass drum portion may be delayed slightly from the relatively higher frequency cymbal. Users of audio systems are accustomed to hearing such audio playback, which may not be indicative of the intended listening experience by the recording artist and/or producers.

SUMMARY

Systems and methods disclosed herein are directed to audio systems, methods, and processing that adjust audio delays in one portion of an audio frequency spectrum relative to another portion of the audio frequency spectrum. Adjustment of the relative delay may be user selectable or configurable by a user interface input. In various examples, an audio system may be capable of rendering audio with tight alignment, e.g., having substantially all of the audio signal components or spectrum experience the same delay. Such tight alignment may be unusual for some listeners that are accustomed to more conventional audio systems that tend to delay a portion of the audio frequency spectrum more so than other portions. Accordingly, audio systems, methods, and processing in accord with those herein may allow a user to adjust delays in portions of the audio frequency spectrum relative to other portions. As a result, audio systems, methods, and processing in accord with those herein may allow a user to adjust how "tight" the rendered audio sounds, e.g., how well temporally aligned are differing components of the rendered audio.

According to various aspects, audio systems and methods are provided that adjust an audio playback signal by receiving an audio signal, filtering the audio signal to provide an adjusted audio signal having a delay in a first range of frequencies relative to a second range of frequencies, and providing the adjusted audio signal to a sound reproduction system for conversion into an acoustic signal.

In some examples, the first range of frequencies may be lower than the second range of frequencies.

In certain examples the delay may be adjustable in response to a user control input.

In various examples, filtering the audio signal to provide the adjusted audio signal may include filtering via an all-pass filter.

According to some examples the adjusted audio signal may have a second delay in a third range of frequencies relative to the first range of frequencies.

In certain examples the delay may be a group delay.

In various examples the delay is a varying delay across the first range of frequencies. In some examples the varying delay may be larger for lower frequencies within the first range of frequencies than for higher frequencies within the first range of frequencies.

Various examples also receive a second audio signal, filter the second audio signal to provide a second adjusted audio signal having a second delay in a third range of frequencies relative to a fourth range of frequencies, and provide the second adjusted audio signal to the sound reproduction system for conversion into a second acoustic signal in a listening area different from a listening area of the acoustic signal. In some examples, the second delay is adjustable in response to a second user control input.

Some examples include amplifying a driver signal based upon the adjusted audio signal and may include transducing the driver signal to produce the acoustic signal.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples and are incorporated in and constitute a part of this specification but are not intended as a definition of the limits of the invention(s). In the figures, identical or nearly identical components illustrated in various figures may be represented by a like reference character or numeral. For purposes of clarity, not every component may be labeled in every figure. In the figures.

DETAILED DESCRIPTION

Aspects of the present disclosure are directed to audio systems, methods, and processing that actively adjust delays in portions of the audio frequency spectrum relative to other portions, to influence the temporal alignment of varying components of a rendered audio signal, e.g., as rendered by one or more acoustic transducers (loudspeakers). In various examples, such audio systems, methods, and processing may be deployed in various listening environments, such as homes, automobiles, and the like.

Figure 1:
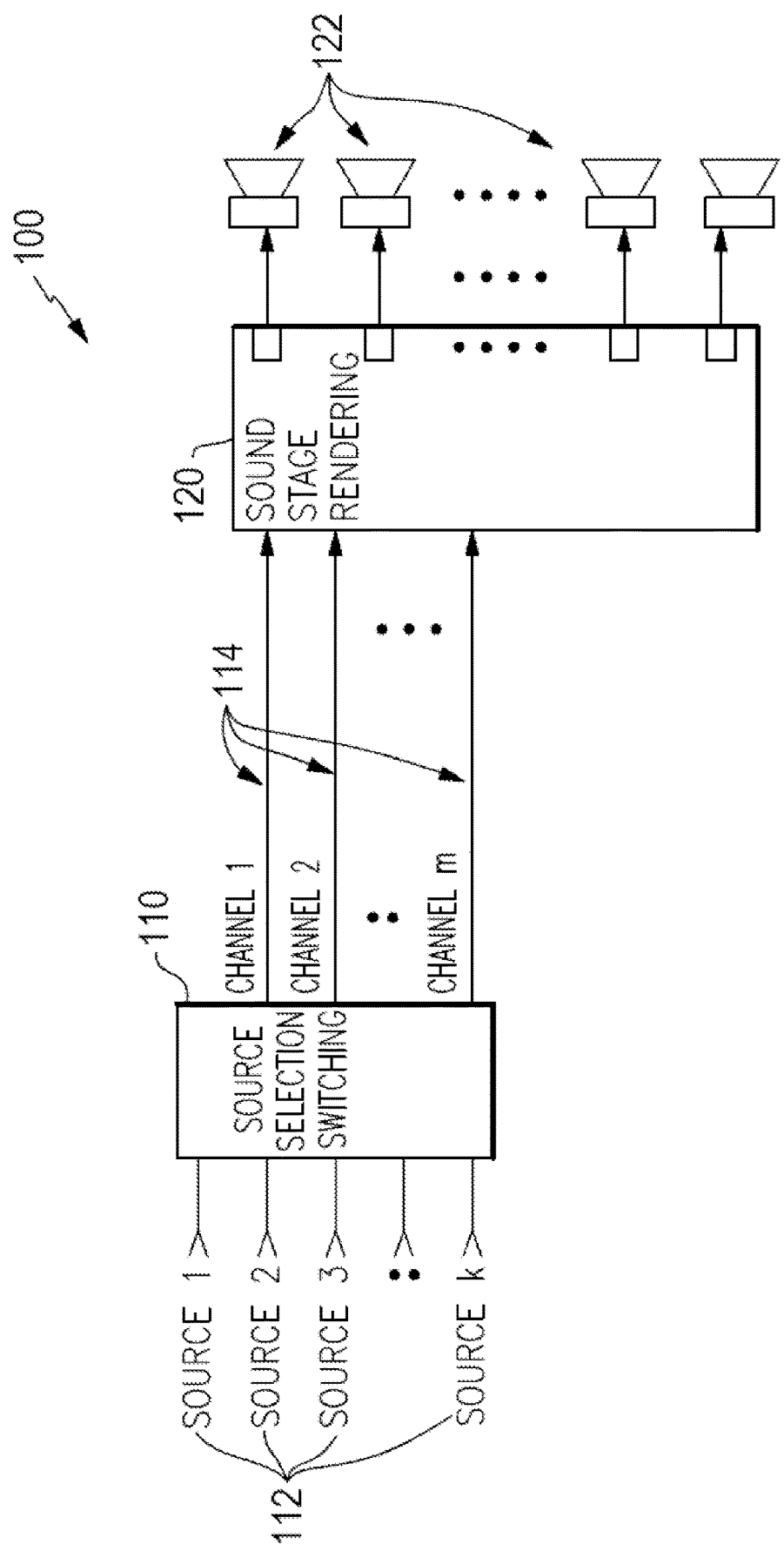
FIG. 1 is a schematic diagram of an example audio system.

FIG. 1 illustrates an example audio system 100 that includes source selection switching 110 to allow selection from among multiple audio sources 112 to provide one or more audio signal channels 114 for rendering as acoustic signals. The audio system 100 also includes a sound stage processor 120 to control output to a number of acoustic transducers 122. In various examples, the sound stage processor 120 may implement various signal processing, including signal analysis, signal separation, signal combining, up-mixing, down-mixing, and the like, to achieve a particular sound field within the listening environment and/or to achieve certain perception by one or more listeners in the environment, such as audio spatialization (sound perceived to come from various locations) or audio zones (sound heard by a listener in one location more so than by a listener in another location).

In particular examples, the audio system 100 may be installed in an automobile for which the sound stage processor 120 may be highly programmed or configured to achieve a certain sound field distribution and equalization, which may be considered a specific 'tuning' of the audio system in the automobile. Unlike a home environment, a particular automobile cabin may include a relatively fixed arrangement of interior space, objects, and materials, such that a particular tuning may be pre-arranged or configured by a sound system designer, original equipment manufacturer (OEM), or the like.

According to various examples, the sound stage processor 120 may produce inconsistent delays across various components of one or more of the audio signal channels 114, such that when audio is rendered by the acoustic transducers 122, the audio output associated with the various components may not be temporally aligned, e.g., synchronized, to the same extent that they were in the audio signal channels 114. In some examples, for instance, bass or lower frequencies may be delayed more than treble or higher frequencies. Thus, as one example for illustration, a snare drum may be heard by a listener just slightly before a bass guitar, even though the bass guitar may be in sync with the snare drum in the original audio signal channels 114. To be clear, such a difference in arrival times may not be perceived by the listener as a delay or out-of-sync condition, rather the delay may be so slight that the listener simply has a different perception of the sound of the audio system, as compared to one without the introduction of such delays.

It is possible in various scenarios for a technician to achieve a tuning that may maintain the original temporal alignment, or nearly so, of the various components of the source audio signal. Given precision measurements about the acoustic response of the environment, and in particular in an automobile cabin, and sufficient processing power to apply various methods, such as numerical methods, to design the sound stage processing (the tuning) it may be possible to achieve an acoustic rendering that very nearly maintains the original alignment of the components of the source audio signal, despite the amount of processing performed on the various signal channels 114 by the sound stage processor 120.

It may be possible in some instances to achieve such a response (of maintained time alignment) and to such a degree that an occupant of the vehicle may perceive the audio as sounding different than expected. For instance, someone who is used to listening to a conventional automotive audio system (wherein lower frequencies may have been delayed relative to higher frequencies) may experience a tightly tuned audio system (wherein the synchronization of the lower and higher frequencies is better maintained) as sounding different. In such cases, it may be desirable to allow the vehicle occupant (or user) to adjust the temporal alignment. For instance, a user control may be provided that allows the user to adjust the temporal alignment between that of the tightly tuned system and the conventional system tuning, in at least one example.

Figure 2:
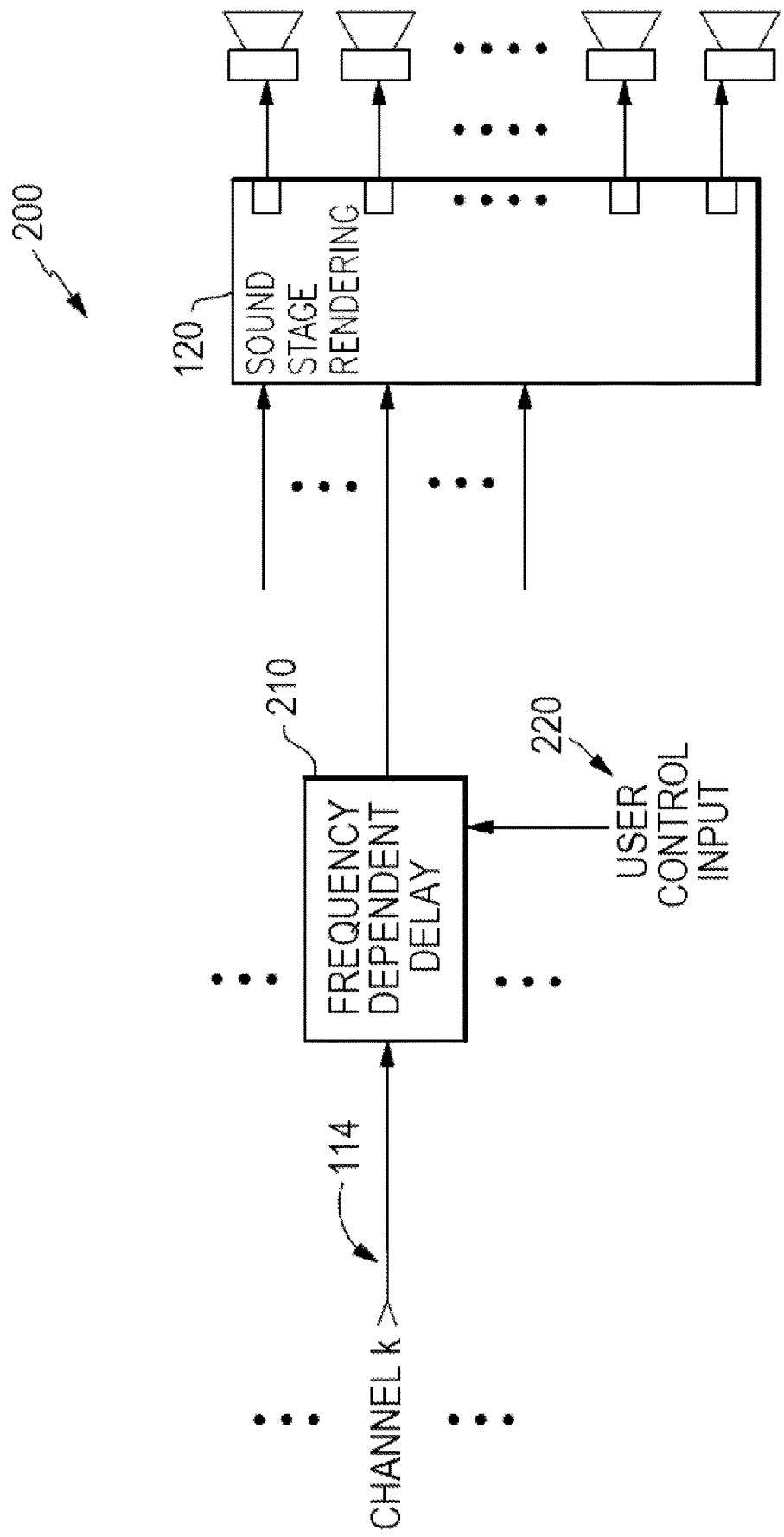
FIG. 2 is a schematic diagram of another example audio system.

FIG. 2 illustrates an example audio system 200 that includes such an option for a user to adjust the temporal alignment of various components of a source audio signal. The audio system 200 is similar to the audio system 100 of FIG. 1, having various audio signal channels 114 and sound stage processing (by a sound stage processor 120). The audio system 200 of FIG. 2 also includes a delay 210 that operates on at least one of the audio signal channels 114 and may be controlled by a user control input 220 in some examples. According to various examples, the delay 210 may be a frequency dependent delay in that it is configured to delay some frequencies more than others. In various examples, the delay 210 may apply a group delay to lower frequencies of the audio spectrum. The amount of delay may be adjustable based upon the user control input 220.

In some examples, a range of frequencies to which the delay is applied may also be adjustable based upon the user control input 220. In some examples, the delay 210 may apply a fixed (but adjustable) amount of delay to a set range of frequencies and may apply a different amount of delay, or no delay, to another range of frequencies. (See FIG. 3) In other examples, the delays applied by the delay 210 may smoothly transition across a range of frequencies.

In some examples, the delay 210 may be implemented as an all-pass filter that may apply a group delay to a lower frequency range. The amount of the group delay may be adjustable based upon the user control input 220. An upper frequency range, or a boundary between the lower frequency range to which the delay is applied and the upper frequency range to which less or no delay is applied may be adjustable based upon the user control input 220. In some examples, a number of all-pass filters may be pre-designed to provide varying delays and frequency boundaries and an appropriate one of the filters may be selected and applied to the audio signal channel 114 based upon the user control input 220.

According to various examples, the delay 210 may act on an audio signal channel 114 at various locations in a signal processing chain. For example, while the delay 210 is illustrated as being applied prior to the sound stage processor 120, the delay 210 may be applied within the sound stage processor 120 or may be applied to the signal outputs to the loudspeakers. Accordingly, in various examples, a delay 210 may be applied anywhere in the signal processing chain, based on particular audio system designs. For instance, the delay 210 may be applied at a source 112 input, before an up-mixer, after an up-mixer, before a down-mixer, after a down-mixer, or elsewhere, in accord with however a system designer chooses.

Further, while the delay 210 illustrated in FIG. 2 (and FIG. 3) is shown as acting on a single audio signal channel 114, there may be multiple such delays 210, each of which is applied to a separate audio signal channel 114. Each of such multiple delays 210 may be adjustable based upon one or more user control inputs 220. In some examples the delay 210 may be (or may be considered to be) a multi-channel delay.

Figure 3:
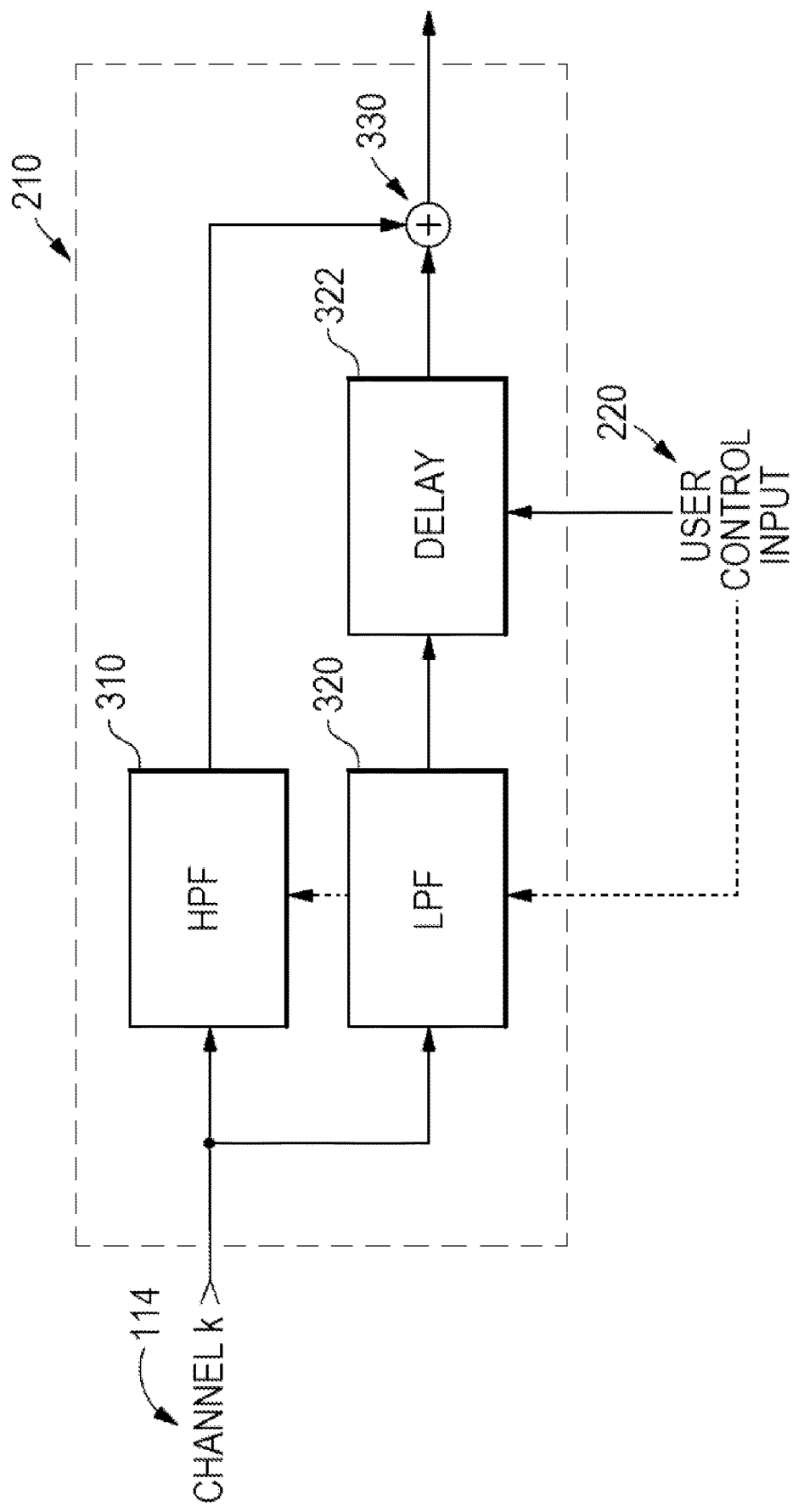
FIG. 3 is a schematic diagram of various details of an example implementation of the audio system of FIG. 2.

Turning to FIG. 3, there is illustrated one example implementation of a frequency dependent delay 210. The audio signal channel 114 is received and applied to each of a high pass filter 310 and a low pass filter 320. The high pass filter 310 allows through frequencies above a cutoff frequency. The low pass filter 320 allows through frequencies below a cutoff frequency. Generally, the cutoff frequency of the high pass filter 310 may be the same as the cutoff frequency of the low pass filter 320, but such may not be the case in various examples. In some examples, the cutoff frequency may be adjustable and based upon the user control input 220. A delay block 322 is applied to the output of the low pass filter 320. An amount of delay applied may be adjustable based upon the user control input 220. In various examples, the user may be able to adjust the delay block 322 to apply zero delay. The delayed low frequency portion is combined with the (undelayed) high frequency portion by a combiner 330 to provide an output audio signal channel.

In some examples, the delay block 322 may be implemented as an all-pass filter that may apply a group delay to a lower frequency range. The amount of the group delay may be adjustable based upon the user control input 220. In some examples, a number of all-pass filters may be pre-designed to provide varying delays and frequency boundaries and an appropriate one of the filters may be selected and applied as the delay block 322 based upon the user control input 220.

In some examples, applying a delay, such as by the delay 210, the delay block 322, or other various means, may cause a perceptual change in volume, loudness, or the like, and a magnitude adjustment may be applied by the audio system to correct or compensate for the perceptual change in volume, loudness, or the like.

In certain examples, applying a delay, such as by the delay 210, the delay block 322, or other various means, may cause a perceptual change in spectral balance, quality, tone, timbre, or the like, and an EQ adjustment may be applied by the audio system to correct or compensate for the perceptual change in spectral balance, quality, tone, timbre, or the like.

With continued reference to FIG. 3, as one example of a frequency dependent delay 210, various audio systems, methods, and processing in accord with those herein may implement multiple filters 310, 320, to separate the audio signal channel 114 into numerous frequency ranges, each of which may be delayed by one of multiple delay blocks similar to the delay block 322, wherein each of the delay blocks may apply a delay based upon the user control input 220. In some examples, differing methods of separating the audio signal channel 114 into numerous frequency ranges may be used. In certain examples, the audio signal channel 114 may be separated into three frequency ranges. Other examples may separate the audio signal channel 114 into four or more frequency ranges. Any number of frequency ranges, with appropriate delays applied to each, may be suitable to accommodate varying system needs and design preferences. In some examples, audio systems, methods, and processing in accord with those herein may tend to converge upon a smooth group delay, or delay curve or contour, as more frequency ranges are implemented. Further, such may converge or tend to the equivalent of an all-pass filter. Accordingly, a plurality of delay filters acting on differing (or overlapping) frequency ranges may be a substitute for an all-pass filter or for a more complex filter having a contoured delay curve.

In some audio systems, methods, or processing, user audio experience may be delivered in a manner dependent on user position, such as zones of audio having differing characteristics. For example, in an automotive environment different seating positions may allow for differing tone, balance, fade, and similar user selectable adjustments to audio. In some examples, different positions may be able to play back different content, such as one passenger listening to different content than another passenger. Such different positions may be called 'zones' or the system may be referred to as a zone-based audio system. In such examples, a user control such as the user control input 220, may be provided for each of multiple positions or zones of the audio system. In various examples a position or zone may accommodate multiple users.

Examples of the methods and apparatuses discussed herein are not limited in application to the details of construction and the arrangement of components set forth in the above descriptions or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Also, the phraseology and terminology used herein is for the purpose of description and should not be regarded as limiting. Any references to examples, components, elements, acts, or functions of the systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation, unless the context reasonably implies otherwise.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of adjusting an audio playback signal, the method comprising:
   receiving an audio signal;
   receiving a user control input;
   filtering the audio signal to provide an adjusted audio signal having a delay in a first range of frequencies relative to a second range of frequencies, the delay based upon, at least in part, the user control input; and
   providing the adjusted audio signal to a sound reproduction system for conversion into an acoustic signal.

2. The method of claim 1 wherein the first range of frequencies is lower than the second range of frequencies.

3. The method of claim 1 wherein the delay is adjustable in response to the user control input.

4. The method of claim 1 wherein filtering the audio signal to provide the adjusted audio signal comprises filtering via an all-pass filter.

5. The method of claim 1 wherein the adjusted audio signal has a second delay in a third range of frequencies relative to the first range of frequencies.

6. The method of claim 1 wherein the delay is a group delay.

7. The method of claim 1 wherein the delay is a varying delay across the first range of frequencies.

8. The method of claim 7 wherein the varying delay is larger for lower frequencies within the first range of frequencies than for higher frequencies within the first range of frequencies.

9. The method of claim 1 further comprising receiving a second audio signal, filtering the second audio signal to provide a second adjusted audio signal having a second delay in a third range of frequencies relative to a fourth range of frequencies, and providing the second adjusted audio signal to the sound reproduction system for conversion into a second acoustic signal in a listening area different from a listening area of the acoustic signal.

10. The method of claim 9 wherein the second delay is adjustable in response to a second user control input.

11. An audio system comprising:
an input to receive an audio signal;
an input to receive a user control;
a filter that receives the audio signal and produces an adjusted audio signal having a delay in a first range of frequencies relative to a second range of frequencies, the delay based upon, at least in part, the received user control;
an amplifier coupled to the filter that provides a driver signal based upon the adjusted audio signal; and
an acoustic transducer coupled to the amplifier that receives the driver signal and transduces the driver signal into an acoustic signal.

12. The audio system of claim 11 wherein the first range of frequencies is lower than the second range of frequencies.

13. The audio system of claim 11 further comprising a controller coupled to the filter that controls the filter such that the delay is adjustable in response to the received user control.

14. The audio system of claim 11 wherein the filter is an all-pass filter.

15. The audio system of claim 11 wherein the adjusted audio signal has a second delay in a third range of frequencies relative to the first range of frequencies.

16. The audio system of claim 11 wherein the delay is a group delay.

17. The audio system of claim 11 wherein the delay is a varying delay across the first range of frequencies.

18. The audio system of claim 17 wherein the varying delay is larger for lower frequencies within the first range of frequencies than for higher frequencies within the first range of frequencies.

19. The audio system of claim 11 further comprising a second input to receive a second audio signal, a second filter that receives the second audio signal and produces a second adjusted audio signal having a second delay in a third range of frequencies relative to a fourth range of frequencies, a second amplifier coupled to the second filter that provides a second driver signal based upon the second adjusted audio signal to provide a second acoustic signal based upon the second driver signal in a listening area different from a listening area of the acoustic signal.

20. The audio system of claim 19 wherein the second delay is adjustable in response to a second user control input.

\* \* \* \* \*